(12) United States Patent
Roughton (10) Patent No.: US 11,433,594 B2
(45) Date of Patent: Sep. 6, 2022

(54) RAPID POWDER PRESSING PLATE ASSEMBLY AND PROCESS

(71) Applicant: ACME COSMETIC COMPONENTS, LLC, Secaucus, NJ (US)

(72) Inventor: Michael W. Roughton, Newark, NJ (US)

(73) Assignee: ACME Cosmetic Components LLC, Secaucus, NJ (US)

( * ) Notice: Subject to any disclaimer, the term of this patent is extended or adjusted under 35 U.S.C. 154(b) by 411 days.

(21) Appl. No.: 16/359,382

(22) Filed: Mar. 20, 2019

(65) Prior Publication Data

US 2019/0291336 A1     Sep. 26, 2019

Related U.S. Application Data

(60) Provisional application No. 62/645,468, filed on Mar. 20, 2018.

(51) Int. Cl.
| | |
|---|---|
| *B29C 59/00* | (2006.01) |
| *B29C 59/02* | (2006.01) |
| *B33Y 80/00* | (2015.01) |
| *B29K 105/00* | (2006.01) |

(52) U.S. Cl.
CPC .......... *B29C 59/002* (2013.01); *B29C 59/022* (2013.01); *B29C 2059/023* (2013.01); *B29K 2105/251* (2013.01); *B33Y 80/00* (2014.12)

(58) Field of Classification Search
CPC ............ B29C 2059/023; B29C 59/002; B29C 59/022; B29C 59/02; B29K 2105/251; B33Y 80/00
See application file for complete search history.

(56) References Cited

U.S. PATENT DOCUMENTS

2009/0084278 A1     4/2009   Masl et al.

OTHER PUBLICATIONS

Dupont Cyrel Fast 1000 TD, Thermal Solvent-Free, Flexographic Plate Processor. http://www.dupont.com/content/dam/assets/products-and-services/printing-package-printing/PG/assets/NA/EDS-NA0001-EN_Cyrel_FAST_1000_TD-i.pdf.

*Primary Examiner* — Robert J Grun
(74) *Attorney, Agent, or Firm* — Ballard Spahr LLP (57) ABSTRACT

A powder pressing plate assembly includes a pressing plate having a plurality of pressing tools and at least one etched plate attached to a pressing tool face of at least one of the plurality of pressing tools. The etched plate includes a design that may be embossed into a substrate. The design may be computer generated and then transferred to the etched plate via a solvent-less thermal exposure process, exposure to certain solvents used to wash away unwanted material, or built up using a three-dimensional printing or additive manufacturing process.

19 Claims, 8 Drawing Sheets

RAPID POWDER PRESSING PLATE ASSEMBLY AND PROCESS

CROSS-REFERENCE TO RELATED APPLICATIONS

This application claims priority to and the benefit of U.S. Provisional Patent Application Ser. No. 62/645,468, filed Mar. 20, 2018, which is incorporated herein by reference in its entirety.

BACKGROUND

Powders stored in containers are oftentimes pressed therein. In such instances, the particulates of the powder are compressed together and conjoined to transform the loose powder into pressed powder, which has a solid-like structure with a geometry that is defined by the container in which it is stored. Compressing a powder within a container permits more particulate to be stored within a given container as compared to powder that is not pressed. Moreover, compressing a powder within a container may facilitate an end-user's use of the powder, such as by decreasing waste or improving ease of application.

Pressed powders may be found in extensive use throughout the cosmetics industry. Common uses of pressed powders include products such as, for example, blushes, foundations, eye shadows, and others. In various applications in the cosmetic industry, the pressed-powder products may be embossed with a design. These designs may include, without limitation, the associated company name or logo, product name or logo, a graphic image, or other aesthetic design characteristic such as a geometric or free form pattern that enhances the appearance of the powder. Embossed powders are useful for branding purposes, marketing, and aesthetic reasons, among others.

Despite these benefits, many manufacturers are constrained from embossing their pressed-powder products due to the cost and/or impracticality of current methods. For example, manufacturers must invest capital to develop the tools necessary to emboss their products and, in many cases, manufacturers must continue to invest new capital to alter their press equipment as embossing designs are changed and/or added. Thus, some manufacturers have been reluctant to invest the necessary capital to add to or change embossments on the finished surfaces of their pressed powders, while others have found embossing entirely cost-prohibitive. Therefore, there remains a need for improvements in powder embossing.

SUMMARY

The present disclosure relates to micro-embossers and methods of micro-embossing a substrate. For example, a method may comprise creating a design; transferring the design to at least one etched plate; attaching the at least one etched plate to a pressing tool; and pressing the at least one etched plate into the substrate to thereby impart the design to the substrate.

As another example, a method may comprise electronically creating a design; creating a plurality of etched plates each having a bottom face with the design arranged thereon, wherein the plurality of etched plates are created as a unitary sheet of unseparated etched plates; attaching the plurality of etched plates to a corresponding pressing tool of the pressing plate assembly; and embossing the design on the substrate.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure, as will occur to one of ordinary skill in the art and having the benefit of this disclosure.

DETAILED DESCRIPTION

The present disclosure generally relates to powder press assemblies and, more particularly, to powder press assemblies for quickly and efficiently altering the design to be embossed.

As discussed above, powder press assemblies in commercial use that emboss designs are not readily or inexpensively changeable. The embodiments described herein provide a powder-pressing plate assembly with one or more etched plates that may be rapidly changed and/or modified to accommodate different designs.

As used herein, "embossing" or "micro-embossing" refers to embossing, debossing or a combination of embossing and debossing, and comprises the process of creating a raised, protruding, recessed or a combination of raised, protruding and/or recessed relief design on a substrate.

Figure 1A:
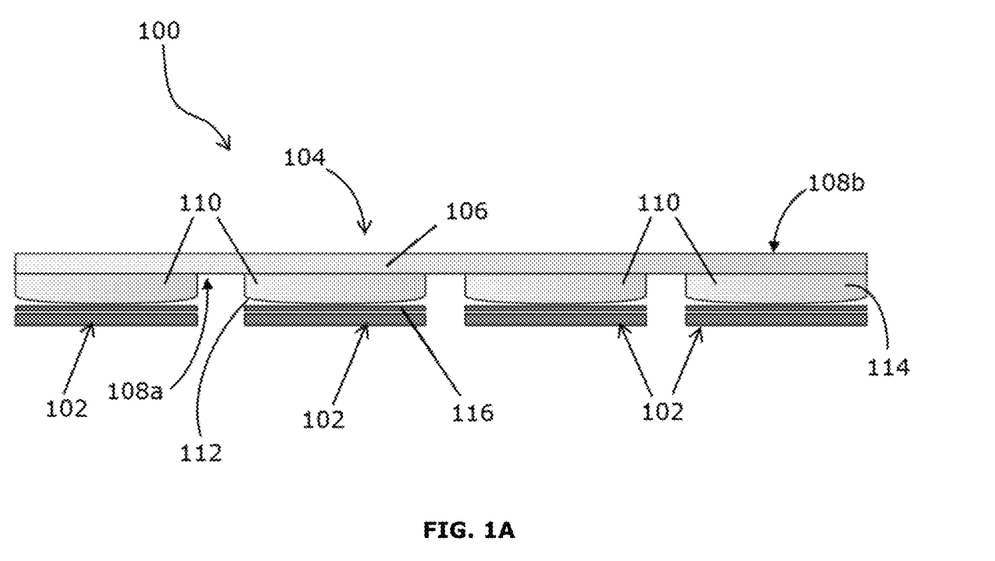
FIG. 1A is a side view of an example pressing plate assembly that may incorporate the principles of the present disclosure.
Figure 1B:
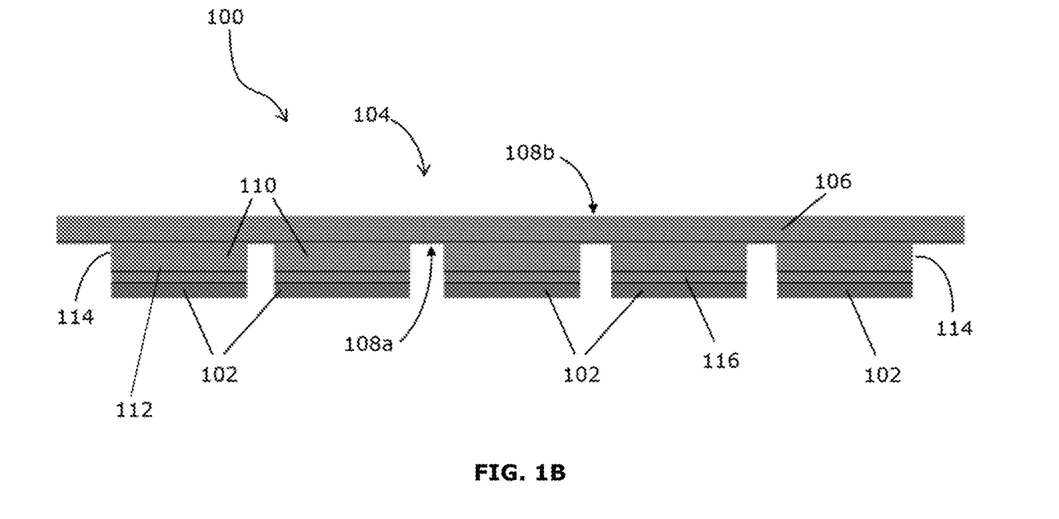
FIG. 1B is a side view of another example pressing plate assembly.

FIG. 1A and FIG. 1B illustrate side views of example pressing plate assemblies 100 that may incorporate the principles of the present disclosure. The depicted pressing plate assemblies 100 are just two examples of a pressing plate assembly that may suitably incorporate the principles of the present disclosure. Indeed, many alternative designs and configurations of the pressing plate assemblies 100 may be employed, without departing from the scope of this disclosure. While the pressing plate assemblies 100 are hereinafter described with reference to exemplary pressing processes, it should be appreciated that they may also or instead be utilized in other powder-processing operations, such as sintering. As will be appreciated, the pressing plate assemblies 100 may be differently configured with any number of shapes, sizes, and designs other than what is illustrated herein, without departing from the present disclosure.

As illustrated, the pressing plate assembly 100 includes one or more etched plates 102 and a pressing tool base or pressing plate base 104 (hereinafter, the base 104). The base 104 includes a plate 106 having a bottom side 108a and a top side 108b, and further includes one or more pressing plates or pressing tools 110 extending from the bottom side 108a. The pressing tools 110 each include a pressing tool face 112 that may be applied under pressure to a loose powdered substrate (not illustrated) to compress it into a pressed powder (not illustrated). In addition, the pressing tool face 112 may have various surface geometries or combinations of surface geometries. For example, the pressing tool face 112 may be convex (FIG. 1A), flat (FIG. 1B), concave, or include various combinations of curvatures or changes in relief without departing from the present disclosure. Also, the etched plates 102 may include interior faces configured to mate with the pressing tool face 112 and, therefore, the interior faces of the etched plates 102 may be configured with surface geometries that correspond with the surface geometry of the pressing tool face 112.

As illustrated, the pressing tools 110 each include a peripheral sidewall 114 that extends between the pressing tool face 112 and the bottom side 108a of the plate 106. Here, each peripheral sidewall 114 defines a cylindrical pressing tool geometry. In other embodiments, however, the peripheral sidewalls 114 define other pressing tool shapes including, but not limited to, square, rectangular, or triangular geometries, or free form shapes, for example a semi-circular shape representing an eyebrow or a heart segment. In still other embodiments, the pressing tools 110, or groups of pressing tools 110 (i.e., two or more pressing tools 110), may each have a different pressing tool geometry.

In some embodiments, the base 104 includes five staggered rows and five columns of pressing tools 110, which may number thirteen in total as illustrated below with reference to FIGS. 3-4. In other embodiments, however, the base 104 may be arranged in more or less rows, staggered or otherwise, and may include more or fewer than thirteen pressing tools 110. For example, the base may be arranged with as few as one pressing tool 110, or any other number, which may vary with the size of the base 104 and the desired geometry and/or shape of the pressing tools 110. Also in the illustrated embodiment, the pressing plate assembly 100 includes thirteen etched plates 102 that are each disposed on one of thirteen pressing tools 110. However, fewer than thirteen etched plates 102 may be utilized in this embodiment. Moreover, in embodiments with greater than thirteen pressing tools 110, an equal or lesser number of etched plates 102 may be utilized therewith. Regardless of the number of etched plates 102 utilized in any particular application, however, the etched plates 102 may include the same or any number of different designs, so that the resulting pressed powders have the same or different designs embossed thereon.

The etched plates 102 are disposed on the pressing tool faces 112 and secured thereto via an adhesive 116. As used herein, "adhesive" 116 may refer to any attachment means to permanently or temporarily secure the etched plates 102 to the pressing tool faces 112. For example, the adhesive 116 may be adhesive substances (e.g., glues, etc.), adhesive tapes, or other mechanical fasteners (e.g., hook and loop fasteners, mechanical joints such as dovetail joints, clips, etc.). In still other embodiments, the adhesive 116 may be a welding connection, magnetic attachment or Velcro attachment. In an illustrated embodiment, the adhesive 116 comprises a double-sided adhesive tape that facilitates a stable mounting of the etched plate 102 on the pressing tool face 112, while also permitting the etched plate 102 to be removed therefrom as needed (e.g., for changing the embossed design, replacing when damaged, etc.). More specifically, the adhesive 116 may include a permanent or semi-permanent, solvent-based or solid adhesive backed double-sided tape, for example, 3M® 447DL Flexomount™ Plate Mounting Tape (available from The 3M® Company) or equivalent. In the illustrated embodiment, the etched plates 102 are secured to the pressing tools 110 at the pressing tool faces 112. In other embodiments, however, the etched plates 102 may be secured to the pressing tools 110 at the peripheral sidewall 114 instead of, or in addition to, being secured at the pressing tool faces 112. The etched plates 102 may be perforated or include other features (e.g., air holes, slots, channels, etc.) that allow air entrapped during the pressing process to escape through or around the face of the etched plate 102 and thus permit evacuation of air trapped between etched plate 102 and the powdered substrate contained within a pan during embossing.

Various techniques may be utilized to form the etched plates 102. In one embodiment, the etched plates 102 are photopolymeric flexographic printing plates with the desired image generated via solvent-based or solvent-free thermal processing methodologies, for example, a Cyrel® FAST Flexographic Plate Processor (available from DuPont®). In other embodiments, the etched plates 102 are plates of an appropriate hardness and thickness (gauge) that are formed via 3D printing or other additive manufacturing techniques, by laser etching, or otherwise crafted by hand through the removal of unwanted plate material that results in the desired aesthetic design(s) for embossing. In some embodiments, sheets of etched plates 102 are produced on sheets of materials such as those detailed above, and the etched plates 102 may be cut, punched, or otherwise removed individually from the sheets. In such embodiments, the etched plates 102 may be perforated to facilitate removal from the sheet. In other embodiments, however, the etched plates 102 may be arranged on such sheets in the same arrangement as the pressing tools 110 extending from the plate 106, such that the etched plate 102 are provided as a unitary or monolithic structure or block. For example, a plurality of the etched plates 102 may be provided on a single sheet as a unitary structure, without individually separating the etched plates 102 therefrom. In such embodiments, the pressing tools 110, with adhesive on the faces 112 thereof, may be driven through such sheets to break each etched plate 102 from the sheet and cause attachment of the same to the pressing tool face 112.

Each of the etched plates 102 may include a design (see FIGS. 2A-2C) that is to be imparted on a medium such as a pressed powder (not illustrated). The design may be transferred to the etched plate 102 by a suitable solvent-washing process, solvent-less thermal processing, 3D printing, or other design transferring process (or technologies). In one embodiment, the design is computer generated, for example, via a CAD software, and then a 3D printing process is utilized to manufacture the etched plate 102 with the design thereon according to the computer-generated design. In other embodiments, however, a 3D printing process is utilized to impart the computer generated design onto the etched plate 102 that has already been manufactured (i.e., prefabricated), whether by a 3D printing process or otherwise. In still other embodiments, the design is generated by hand, converted into a digital image, and then transferred to the etched plate 102 via a 3D printing process or other design transferring process (or technologies). As mentioned, design transferring processes (or technologies) other than 3D printing may be utilized to transfer the design to the etched plates 102. For example, the design may be transferred to the etched plate 102 via hand engraving, laser etching, machining, etc.

Figure 2A:
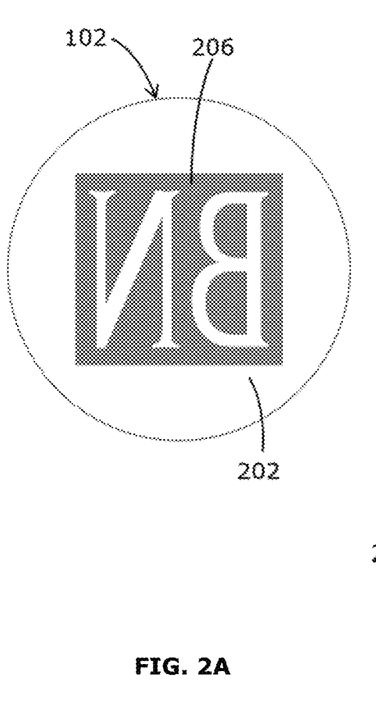
FIG. 2A is a bottom view of an etched plate that may be utilized in the pressing plate assemblies of FIGS. 1A-1B.
Figure 2B:
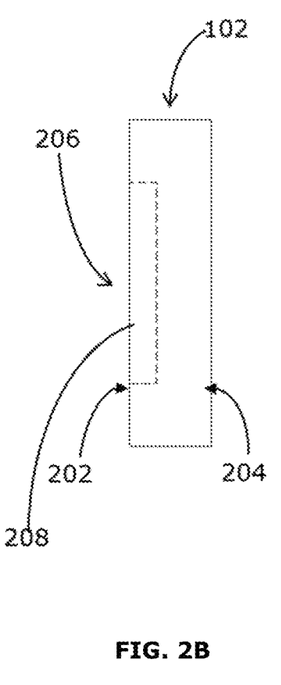
FIG. 2B is a side view of the etched plate of FIG. 2A.
Figure 2C:
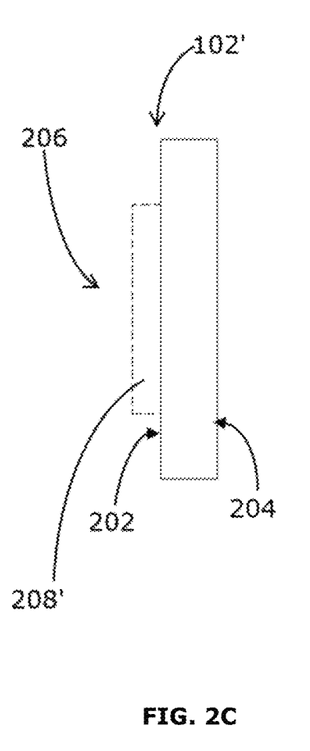
FIG. 2C is a side view of an alternate etched plate that may be utilized in the pressing plate assemblies of FIGS. 1A-1B.

FIG. 2A is a top view of the etched plate 102 that may be utilized with pressing plate assemblies 100 of FIG. 1A or FIG. 1B, according to one or more embodiments of the present disclosure. FIG. 2B illustrates a side view of the etched plate 102 according to one or more embodiments, whereas FIG. 2C illustrates a side view of an alternate etched plate 102' according to one or more other embodiments. The depicted etched plates 102,102' are just two examples of etched plates that may suitably incorporate the principles of the present disclosure. Indeed, many alternative designs and configurations of the etched plates 102,102' may be employed without departing from the scope of this disclosure. Moreover, the etched plates 102,102' may have various surface finishes (not illustrated) that facilitate the pressing process. For example, the etched plates 102,102' may include chamfered edges to facilitate removal of the etched plates 102,102' from a pan (not illustrated) without affecting the imprinted design.

As illustrated, the etched plate 102 includes a bottom face 202, a top face 204 (see FIGS. 2B-2C), and a design 206 on the bottom face 202. In use, a press operator or set-up technician will form (e.g., print, cut, etc.) the design 206 into the bottom face 202, and fasten the top face 204 of the etched plate 102 to the pressing tool face 112 of the pressing tool 110. This process will be repeated for each of the number of pressing tools 110 utilized on the pressing plate assembly 100. Thereafter, the press operator may use the completed pressing plate assembly 100 to emboss the design 206 on a product (not illustrated), for example a cosmetic, by pressing the bottom face 202 of the etched plate 102 into the particulate or substrate (not illustrated) that forms the product (not illustrated) during the stamping process.

FIG. 2B is a side view illustrating the etched plate 102 of FIG. 2A according to one or more embodiments of the present disclosure. Here, the design 206 is a recessed design 208 (sometimes referred to as the "female design") that is (at least partially) oriented between the bottom face 202 and the top face 204. The recessed design 208 is formed into the bottom face 202 of the etched plate 102 such that the resulting pressed powder (not illustrated) includes an embossed design (not illustrated) that mirrors the design 206 and protrudes upward from the surface of the pressed-powder.

FIG. 2C is a side view illustrating an alternate embodiment of an etched plate 102' that may be utilized with pressing plate assemblies 100 of FIG. 1A or FIG. 1B, according to one or more embodiments of the present disclosure. Here, the design 206 is a protruded design 208' (sometimes referred to as the "male design") that extends beyond (i.e., below or outward of) the bottom face 202, rather than extending into the body of the etched plate 102' as described with reference to FIG. 2B. The protruded design 208' is formed on the bottom face 202 of the etched plate 102' such that the resulting pressed-powder (not illustrated) includes an embossed design (not illustrated) that mirrors the design 206 and is (at least partially) recessed below the surface of the pressed powder.

Figure 3:
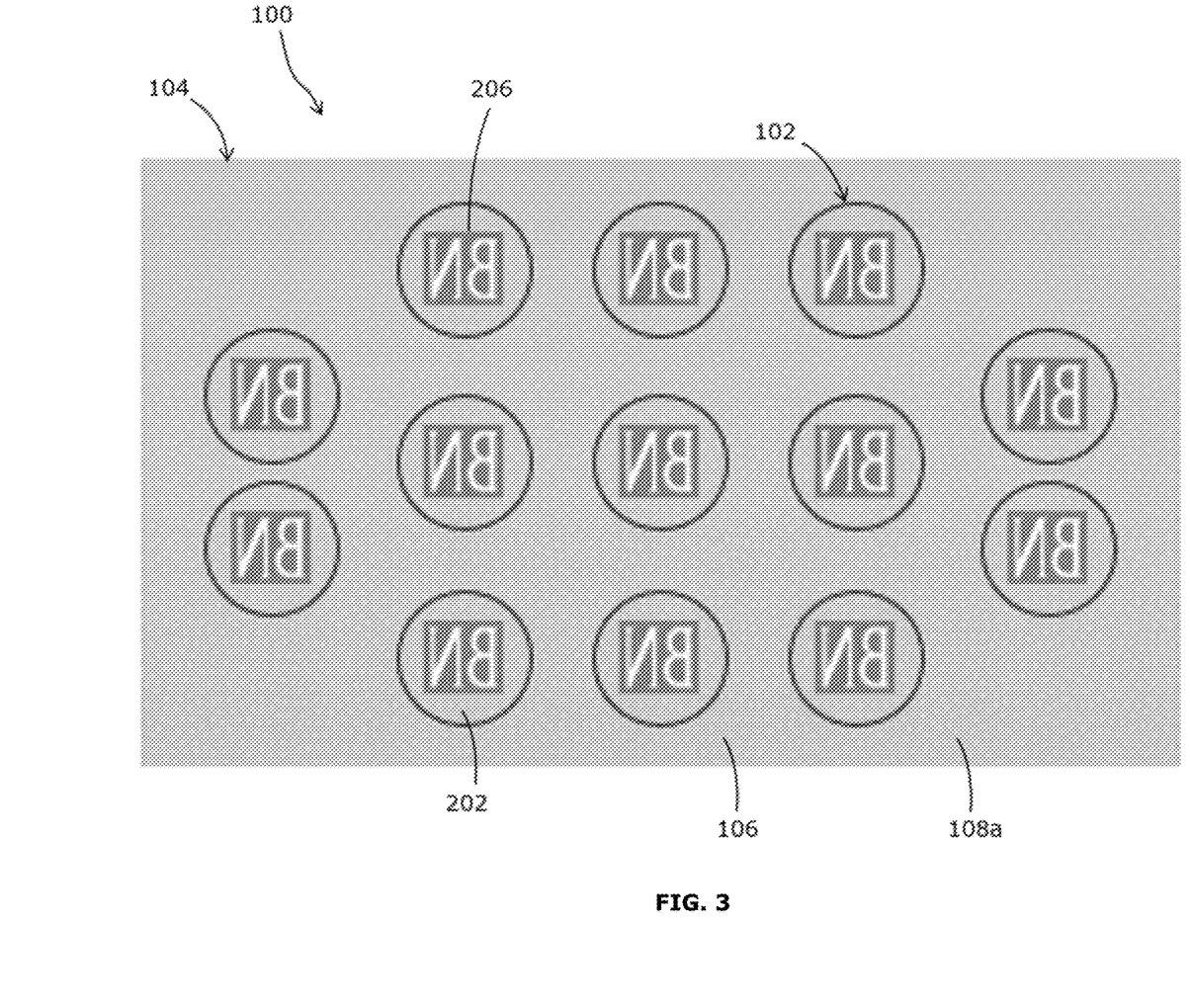
FIG. 3 is a bottom view of the pressing plate assembly illustrating an exemplary arrangement of pressing tools that may be incorporated into the pressing plate assemblies of FIGS. 1A-1B.

FIG. 3 is a bottom view of a pressing plate assembly 100 illustrating an exemplary layout or organization of pressing tools 110, according to one or more embodiments of the present disclosure. In particular, FIG. 3 illustrates a five by five layout of pressing tools 110 and etched plates 102; however, various other layouts may be utilized without departing from the present disclosure. For example, the layout of the pressing tools 110 and etched plates 102 arranged on the plate 106 may be optimized depending on the size of the plate 106 utilized in a particular end-use application, the type of equipment with which the pressing plate assembly 100 will be used, and/or the end-use application itself. Thus, the layout may include various organizations of pressing tools 110 which may be arranged into matrices having rows and columns, either or both of which may be staggered, or in any other non-matrix arrangement or organization.

In the illustrated embodiment, the pressing plate assembly 100 includes thirteen etched plates 102. More specifically, thirteen pressing tools 110 (obscured from view) extend from the bottom side 108a of the plate 106, and the etched plates 102 are each disposed on the pressing tool faces 112 (obscured from view) thereof. It will be appreciated, however, that more or fewer than thirteen etched plates 102 and pressing tools 110 may be utilized, and there need not be a one-to-one relationship between the etched plates 102 and pressing tools 110 (i.e., some pressing tools 110 may not have an etched plate 102). Moreover, the pressing tools 110, regardless of their number, may be differently arrayed (organized) on the bottom side 108a of the plate 106. For example, the pressing tools 110 may be arrayed in a matrix having a different number of columns and/or rows, or the pressing tools 110 may be differently arrayed in non-matrix patterns that may or may not be symmetrical. Also in the illustrated embodiment, each etched plate 102 includes the same design 206. In other embodiments, however, various different etched plates 102 having one or more different designs 206 may be utilized.

Figure 4:
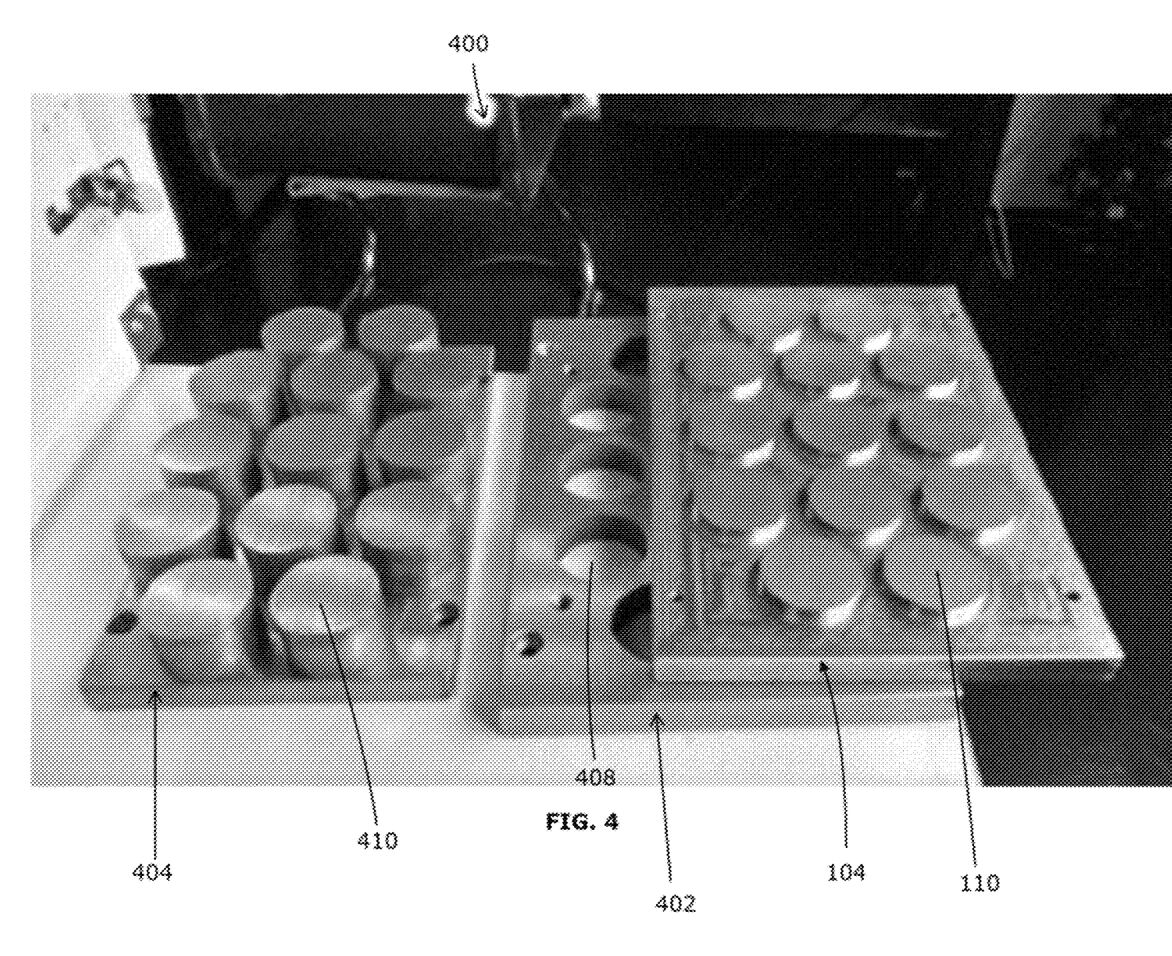
FIG. 4 is a perspective view of an unassembled press assembly.

FIG. 4 is a perspective view of an unassembled press assembly 400 that may be utilized to create the desired aesthetic on the surface of the pressed powder, according to one or more embodiments of the present disclosure. In addition to the base 104, the press assembly 400 comprises a pan surface or middle plate 402 and an ejector plate 404. As illustrated, the middle plate 402 includes a plurality of wells 408 that each correspond with, and are configured to receive, the pressing tools 110. As described below, the middle plate 402 is configured to hold a plurality of pans (see FIG. 5) that are each disposed over, and driven into, a respective well 408 via the corresponding pressing tool 110. In addition, the ejector plate 404 includes a plurality of ejector elements 410 that each correspond with and are configured to be received by the wells 408. In use, the ejector plate 404 is disposed underneath the middle plate 402, but may be engaged therewith to eject or push the pans (FIG. 5) from the wells 408 following actuation of the pressing tools 110.

Figure 5:
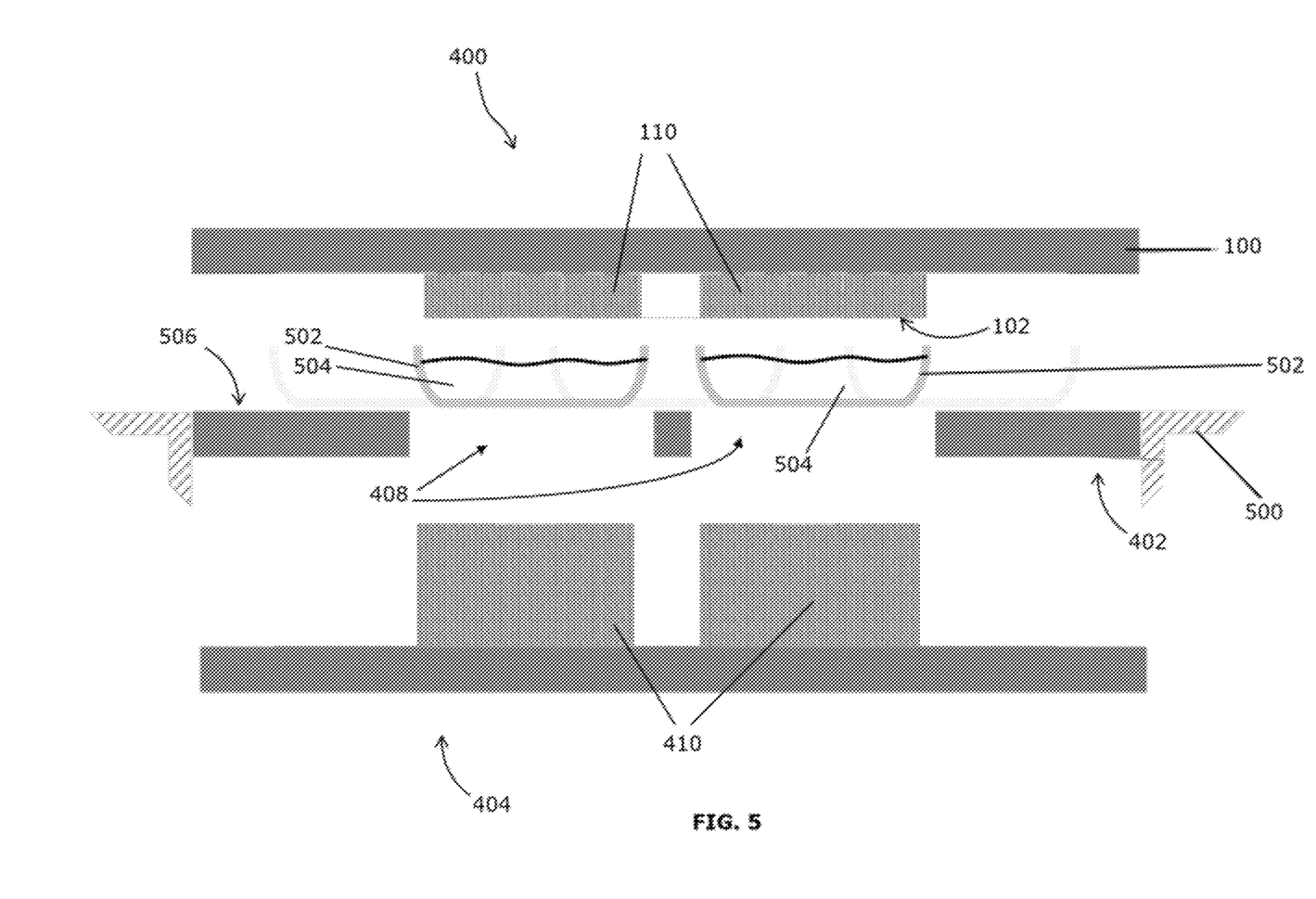
FIG. 5 is a side cross-sectional view of the press assembly of FIG. 4 when installed in a pressing machine.

FIG. 5 illustrates a side cross-sectional view of the press assembly 400 configured within a press machine 500, according to one or more embodiments. Here, the machine 500 is a mechanical powder press that secures the middle plate 402 and is actuatable to separately drive the pressing plate assembly 100 and the ejector plate 404 towards the middle plate 402; however, other types of machines may be utilized, as is known in the art, without departing from the present disclosure. In use, one or more powder receptacles or pans 502 may be arranged within the press assembly 400. The pans 502 may contain a loose (uncompressed) powder or other material 504, and the machine 500 may actuate the pressing plate assembly 100 to compress the material 504 within the pans 502. The machine 500 may then actuate the ejector plate 404 to facilitate removal of the pans 502 from the press assembly 400.

In the illustrated embodiment, the middle plate 402 is secured to the machine 500, and the pans 502 are arranged on a top side 506 of the middle plate 402 above the wells 408. The pans 502 may thus rest above their corresponding wells 408 prior to the pressing process without falling thereinto. Accordingly, the wells 408 may be sized and/or otherwise configured such that the pans 502 may rest therein with sufficient space for placement and removal of the same prior to and after pressing, but tightly enough so as to minimize movement during pressing. In one embodiment, the pans 502 are empty (i.e., not containing any material 504) when placed in the press assembly 400, and the material 504 is applied after one or more of the pans 502 are arranged in the press assembly. In other embodiments, the pans 502 are filled with material 504 before the pans are arranged in the press assembly 400.

Once the pans 502 with material 504 therein have been arranged in their respective wells 408, the pressing plate assembly 100 may be driven towards the middle plate 402 to apply the requisite pressure needed to emboss the design into the material 504. Here, the pressing tools 110 with the etched plates 102 installed thereon will contact and drive the pans 502 into their respective wells 408, thereby compressing the material 504 contained in the pans 502. After the material 504 (e.g., the loose powder) is compressed to the desired level (density or compactness) or has the desired design imparted thereon, the pressing plate assembly 100 is retracted such that the pressing tools 110 and etched plates 102 are removed from the wells 408, and the ejector plate 404 is actuated to remove the pans 502 from the wells 408 of the middle plate 402. The ejector plate 404 may be driven toward the middle plate 402 so that the ejector elements 410 enter the respective wells 408 and push therefrom the pans 502 that contain compressed material 504. Accordingly, the powder pressing assembly 400 may be designed such that minimal material 504 escapes between the edges of the pressing tool 110 and the rims of the pans 502 during pressing, while assuring that sufficient tolerance is left to facilitate easy retraction of the pressing tools 110 from the pans 502 and the wells 408 after pressing.

The preparation of the pressing assembly 400 may include the removal of the etched plates 102 with the desired designs from the etched master sheet (not illustrated), and then sizing the etched plate 102 to the pressing tool 110 based on the desired design and type of material 504 being pressed. In some embodiments, a manual sharp-edged tool may be utilized to size the etched plates 102 to the pressing tool 110. In other embodiments, a pre-sized sharp-edged tool may be utilized to manually or automatically size one or more of the etched plates 102 to the pressing tool 110. For example, the set-up technician or operator might use a sharp knife or razor blade to cut one or more of the etched plates 102 from the etched plate master sheet/plate, or use an open punch with a sharpened edge having the size and shape needed for the design(s) being employed (such as a sharp-edge punch of the desired shape and size). In another embodiment, the etched master sheet/plate may be used in its entirety without the individual designs removed, by simply attaching the etched master sheet/plate to the pressing tools 110 with the appropriate adhesive, tape, or mechanical device, and then the base 104 may be actuated to break the etched plates 102 from their master sheet/plate.

The pressing plate assembly 100 may comprise various materials and may further comprise various surface finishes. In one embodiment, the base 104 is made of stainless steel. In another example, the base 104 is made from copper or brass. However, the base 104 may be manufactured from any number of other materials such as metals, metal alloys, and/or non-metallic materials (or composite materials) such as ceramics or polymers. Also in the illustrated embodiment, the base 104 is bare steel, but might be polished, powder coated, or in other embodiments, the base 104 may have any number of different surface finishes as known in the art. In addition, the base 104 may be modular such that the pressing tools 110 may be installed thereon as desired and in any number of arrangements. For example, the plate 106 may include a number of boltholes to which any number of similar or dissimilar pressing tools 110 may be installed as needed.

FIGS. 6-9 illustrate various exemplary methods for rapidly designing a substrate utilizing the pressing plate assembly 100, according to one or more embodiments of the present disclosure.

Figure 6:
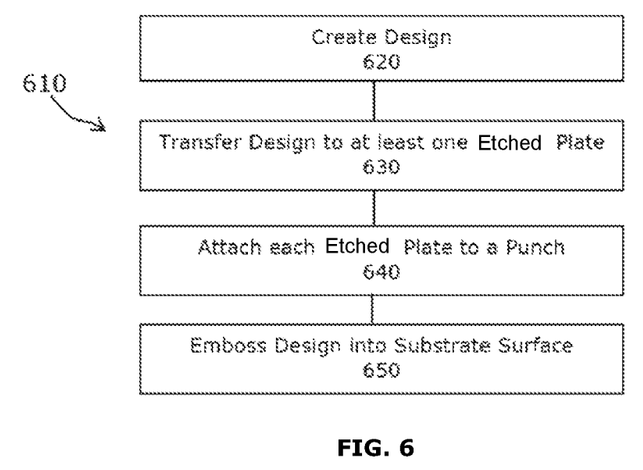
FIG. 6 is a schematic overview of an exemplary process for rapidly designing a substrate utilizing the pressing plate assemblies of FIGS. 1A-1B.

FIG. 6 is a schematic overview of an exemplary process 610 for rapidly designing (or rapidly imparting or forming a design on) a substrate utilizing the pressing plate assembly 100, according to one or more embodiments of the present disclosure. As illustrated, the process 610 comprises the steps of creating a design 620, transferring the design onto at least one etched plate 630, attaching each etched plate to a corresponding pressing tool of a press 640, and then embossing the design into a surface of a substrate 650. The step of transferring the design onto at least one etched plate 630 may be performed during manufacture of the etched plate 102 as described above, for example, during a 3-D printing process. Moreover, the process 610 may be repeated to emboss a different design in quick succession. For example, after embossing the design into a surface of a substrate 650, a second etched plate having a different design may be attached to the pressing tool of a press and then pressed into a surface of the same or different substrate to emboss the different design. The step of embossing the design into a surface of a substrate 650 may be performed by pressing the etched plates into the substrate.

Figure 7:
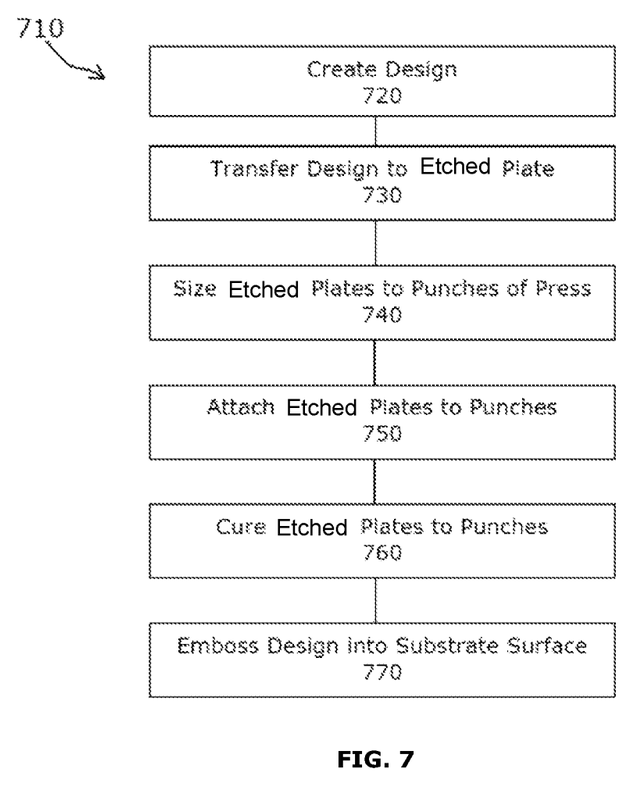
FIG. 7 is a schematic overview of another exemplary process for rapidly designing a substrate utilizing the pressing plate assemblies of FIGS. 1A-1B.

FIG. 7 is a schematic overview of another exemplary process 710 for rapidly designing a substrate utilizing the pressing plate assembly 100, according to one or more embodiments of the present disclosure. As illustrated, the process 710 comprises the steps of creating a design 720, transferring the design onto at least one etched plate 730, sizing each etched plate to a corresponding pressing tool of the press 740, attaching each etched plate to its corresponding pressing tool 750, curing the etched plates to their corresponding pressing tools 760, and then embossing the design into a surface of a substrate 770. Here, the step of sizing each etched plate to a corresponding pressing tool of the press 740 may further include trimming the etched plate so that its perimeter corresponds to the pressing tool face of its corresponding pressing tool. As with the process 610, the process 710 may be repeated to emboss a different design in quick succession.

Figure 8A:
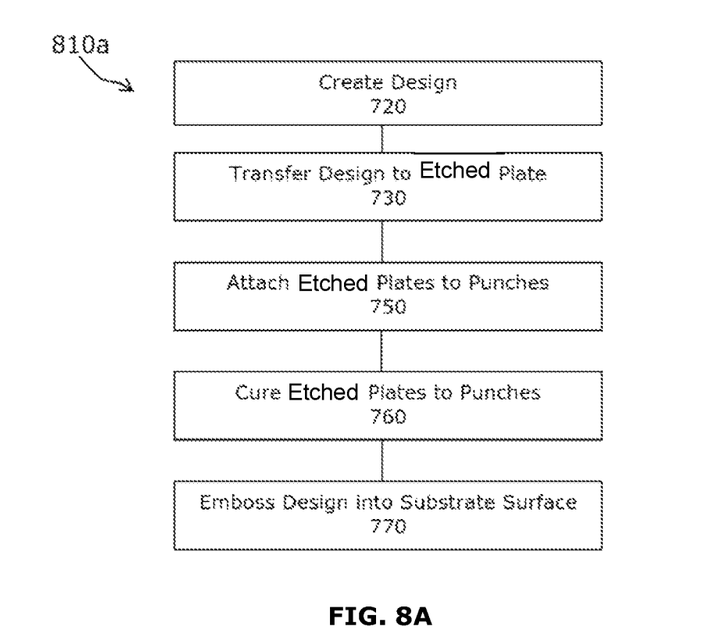
FIG. 8A-B are schematic overviews illustrating variations of the process of FIG. 7.
Figure 8B:
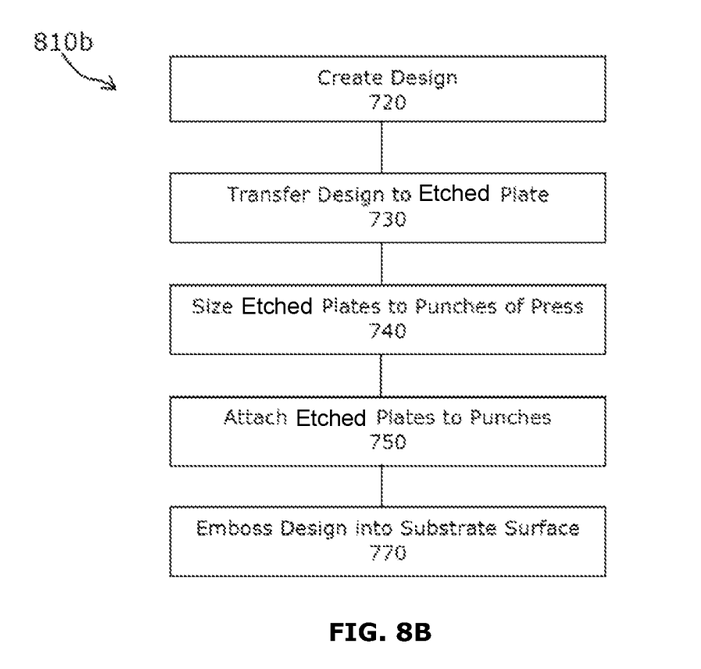

FIGS. 8A and 8B are schematic overviews illustrating variations of the process 710 for rapidly designing a substrate utilizing the pressing plate assembly 100.

FIG. 8A is an exemplary process 810a for rapidly designing a substrate utilizing the pressing plate assembly 100 that is similar to the process 710, except that it does not include the step of sizing each etched plate to a corresponding pressing tool of the press 740. Thus, the process 810*a* may be used in instances where the etched plates are manufactured to fit the pressing tool faces without any additional modification. FIG. 8B is another exemplary process 810*b* for rapidly designing a substrate utilizing the pressing plate assembly 100 that is similar to the process 710 except that it does not include the step of curing the etched plates to their corresponding pressing tools 760. Thus, the process 810*b* may be used in instances where, for example, the etched plates are secured to the pressing tool faces via an adhesive that does not require curing, such as certain types of adhesive substances or via a mechanical fastener. As with the processes 610 and 710, the processes 810*a*,810*b* may be repeated to emboss a different design in quick succession.

Figure 9:
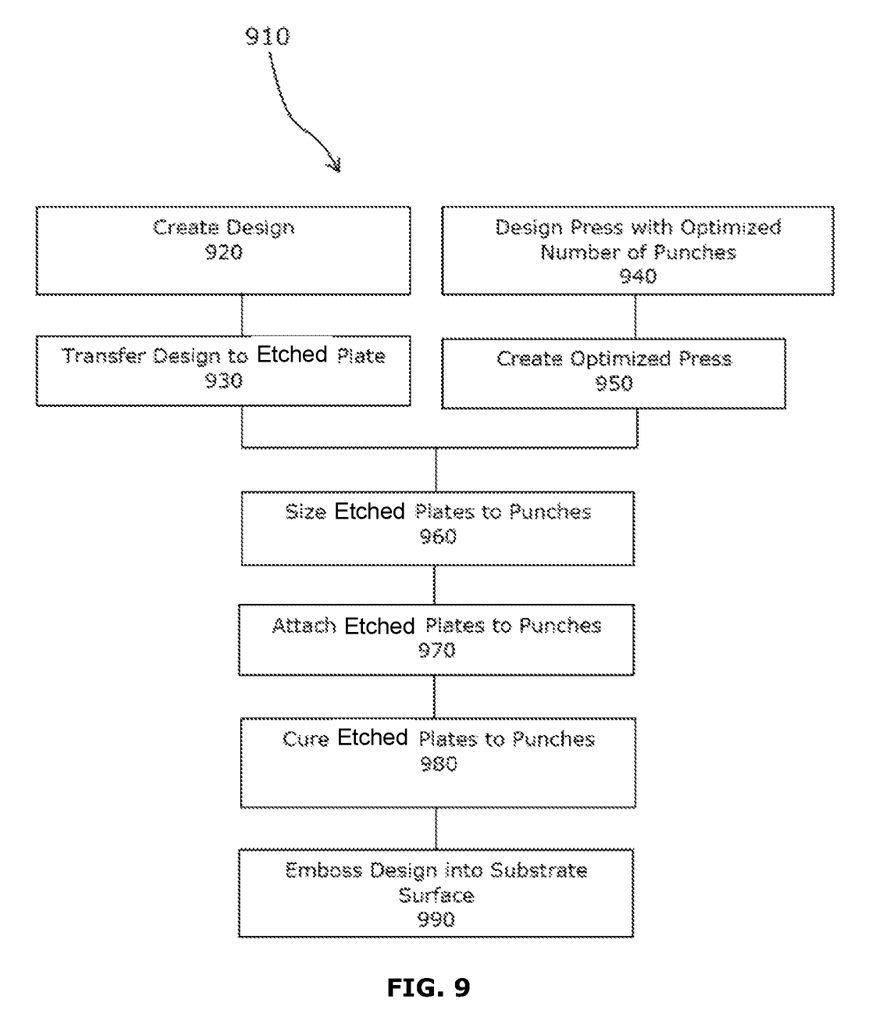
FIG. 9 is schematic overview of yet another exemplary process for rapidly designing a substrate utilizing the pressing plate assemblies of FIGS. 1A-1B.

FIG. 9 is a schematic overview of yet another exemplary process 910 for rapidly designing a substrate utilizing the pressing plate assembly 100, according to one or more embodiments of the present disclosure. This exemplary process 910 is similar to that described with referenced to FIG. 6, and thus includes the steps of creating a design 920, transferring the design onto at least one etched plate 930, attaching each etched plate to a corresponding pressing tool 970, and then embossing the design into a surface of a substrate 990. The exemplary process 910 is also similar to that described with referenced to FIGS. 7-8, and may thus include the optional steps of sizing each etched plate to a corresponding pressing tool of the press 960 and curing the etched plates to their corresponding pressing tools 980.

The exemplary process 910, however, may further include the additional steps of designing a press with an optimized number of pressing tools 940 and then creating the optimized press 950. The steps of designing a press with an optimized number of pressing tools 940 and then creating the optimized press 950 may be performed various times during the exemplary process 910 before the step of attaching the etched plates to the pressing tools 970. For example, they may be performed before, after, or simultaneously with the steps of creating a design 920 and transferring the design onto at least one etched plate 930. Moreover, as with the processes 610,710,810*a*,810*b*, the process 910 may be repeated to emboss a different design in quick succession.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. Singular terms may encompass the plural. If there is any conflict in the usages of a word or term in this specification and one or more patent or other documents that may be incorporated herein by reference, the definitions that are consistent with this specification should be adopted.

The use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method of embossing a design on a powder substrate, the method comprising:
   creating a design;
   manufacturing at least one etched plate and transferring the design to an exterior face of the at least one etched plate during manufacture of the at least one etched plate, wherein the at least one etched plate has an interior face opposite the exterior face, and wherein manufacturing the at least one etched plate and transferring the design to the exterior face thereof are performed in a single step;
   attaching the interior face of the at least one etched plate to a circular face of a cylindrical pressing tool; and
   pressing the at least one etched plate into the powder substrate to thereby impart the design to the powder substrate.

2. The method of claim 1, wherein the design is arranged as a recessed design within the exterior face of the at least one etched plate.

3. The method of claim 1, wherein the design is arranged as a protruded design extending from the exterior face of the at least one etched plate.

4. The method of claim 1, wherein the design is created via a computer software.

5. The method of claim 1, wherein the at least one etched plate is manufactured via three-dimensional printing or additive manufacturing.

6. The method of claim 1, wherein the at least one etched plate is attached to the pressing tool via an adhesive or pressure sensitive tape.

7. The method of claim 6, wherein the step of attaching the at least one etched plate to the pressing tool further comprises curing the at least one etched plate to the pressing tool.

8. The method of claim 1, wherein the at least one etched plate is attached to the pressing tool via a mechanical fastener.

9. The method of claim 1, wherein the at least one etched plate is sized or trimmed to fit a face of the pressing tool corresponding therewith.

10. The method of claim 1, wherein the interior face of the at least one etched plate is not attached to a curved tubular sidewall of the cylindrical pressing tool.

11. The method of claim 1, wherein the interior face of the at least one etched plate and the circular face of the cylindrical pressing tool are both substantially flat.

12. The method of claim 1, wherein the interior face of the at least one etched plate is convex or concave, and the circular face of the cylindrical pressing tool is configured to mate with the convex or concave interior face of the at least one etched plate.

13. A method of using a pressing plate assembly to emboss a powder substrate, comprising:
electronically creating a design;
manufacturing a plurality of etched plates, each etched plate of the plurality of etched plates having an exterior face, wherein the design is transferred to the exterior faces of the plurality of etched plates during manufacture of the plurality of etched plates, wherein each etched plate of the plurality of etched plates has an interior face opposite the exterior face, wherein manufacturing a respective etched plate of the plurality of etched plates and transferring the design to the exterior face of the respective etching plate are performed in a single step, and wherein the plurality of etched plates are created as a unitary sheet of unseparated etched plates;
attaching the interior face of each respective etched plate of the plurality of etched plates to a circular face of a corresponding cylindrical pressing tool of the pressing plate assembly; and
pressing at least one etched plate of the plurality of etched plates into the powder substrate to thereby impart the design to the powder substrate.

14. The method of claim 13, wherein, prior to attaching the interior face of each respective etched plate of the plurality of etched plates to the circular face of the corresponding pressing tool of the pressing plate assembly, at least one of the plurality of etched plates is separated from the unitary sheet of unseparated etched plates.

15. The method of claim 14, wherein the at least one of the plurality of etched plates that is separated from the unitary sheet of unseparated etched plates is separated from the unitary sheet of unseparated etched plates during the step of pressing at least one etched plate of the plurality of etched plates into the powder substrate.

16. The method of claim 13, wherein the step of attaching the interior face of each respective etched plate of the plurality of etched plates to the circular face of the corresponding pressing tool of the pressing plate assembly is preceded by a step of attaching the unitary sheet of unseparated etched plates to the corresponding pressing tools.

17. The method of claim 13, wherein the design of at least one of the plurality of etched plates is configured as a recessed design, a protruded design extending from the at least one etched plate, or a combination thereof.

18. The method of claim 13, wherein the unitary sheet of unseparated etched plates is created via three-dimensional printing.

19. The method of claim 13, wherein at least one of the plurality of etched plates includes a perforation on the exterior face configured to permit evacuation of trapped air.

* * * * *